June 14, 1932. L. H. THOEN 1,862,775
PICK-UP GUARD ADAPTER
Filed Nov 28, 1928
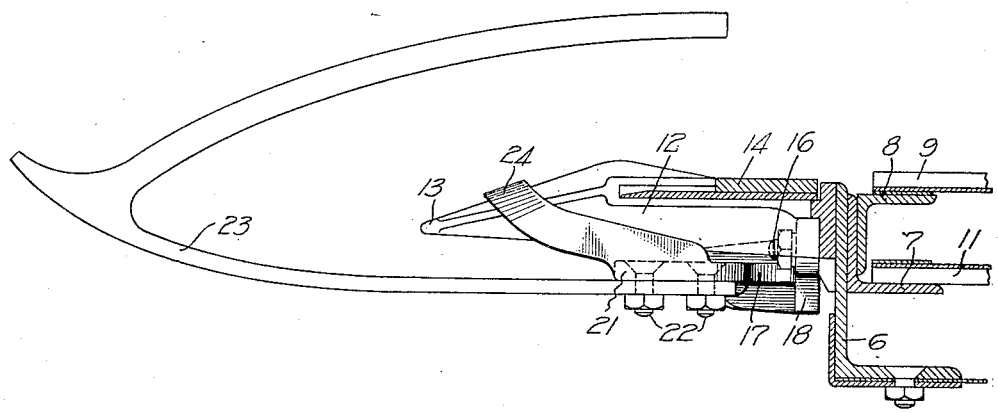
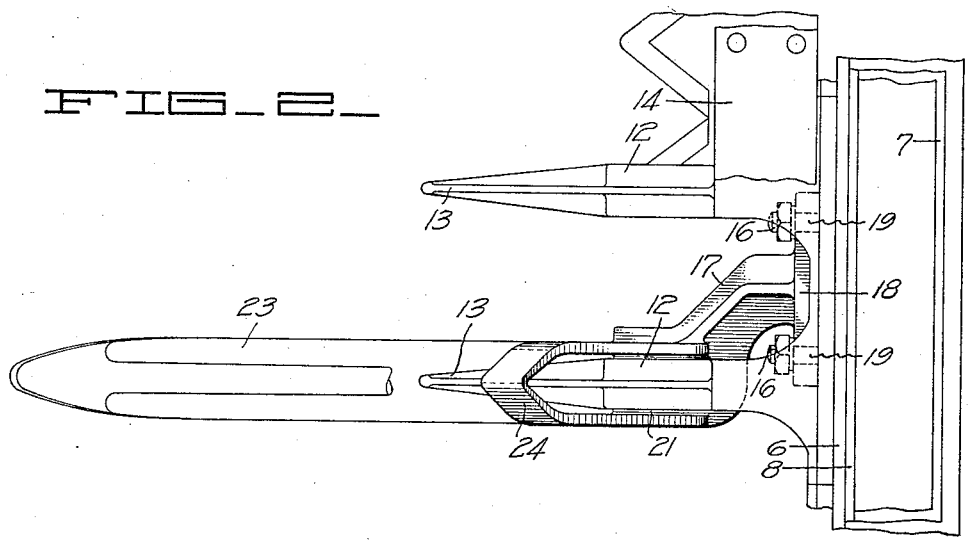
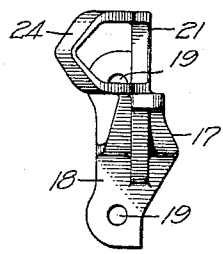
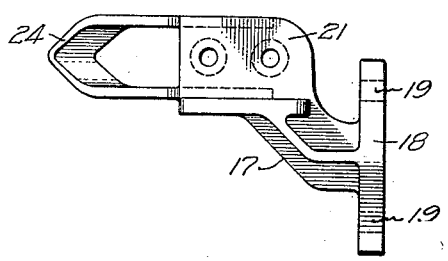
INVENTOR
Lowell H. Thoen
BY
White, Frost & Fryer
ATTORNEYS Patented June 14, 1932

1,862,775

UNITED STATES PATENT OFFICE

LOWELL H. THOEN, OF STOCKTON, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA

PICK-UP GUARD ADAPTER

Application filed November 28, 1928. Serial No. 322,304.

My invention relates to agricultural machinery and primarily to agricultural machines equipped with sickle cutting mechanism. It is customary in such mechanism to provide a sickle bar protected by sickle guards having projecting prongs and to equip such prongs under certain conditions with pick-up guards which project beneath matted grain and lift it into position for action by the sickle bar. Some harvesting machinery is provided with means for the attachment of such sickle guards, but other machinery is not adapted to such attachment. Furthermore, it is often desirable to arrange the pick-up guards in a certain selected spaced relation, but the available supports are not suitable for the arrangement desired.

It is therefore an object of my invention to provide a pick-up guard adapter which permits the installation of pick-up guards on sickle assemblies to which pick-up guards are not ordinarily attachable.

Another object of my invention is to provide a pick-up guard adapter which will permit of the desired location of the pick-up guards.

The foregoing and other objects are attained in the embodiment of the invention shown in the drawing, in which Fig. 1 is a side elevation of the adapter of my invention installed adjacent the sickle assembly of a header, certain portions being shown in cross section.

Fig. 2 is a plan of the device of my invention shown installed on a header.

Fig. 3 is a bottom view of the adapter of my invention.

Fig. 4 is a front elevation of the adapter of my invention.

In its preferred form, my pick-up guard adapter comprises a body having a pad for attachment to a support and a second pad to receive a pick-up guard, together with a looped portion designed to cooperate with the projecting prong of a sickle guard to assist in supporting the adapter and pick-up guard.

In the form of the invention disclosed in the drawing, there is shown a framework 6 forming part of the header of a harvester which includes angles 7 and 8 nested to provide support for the upper run 9 and a lower run 11 of a draper. Secured to the framework 6 is a sickle guard 12 having projecting prongs 13 extending in the direction of advance of the mechanism. Operating in the sickle guard in the usual way is a sickle bar 14. Ordinarily the sickle guard 12 is secured to the framework 6 by bolts 16, passing therethru, making it easily attachable and detachable.

It is sometimes the case that the apertures thru which the securing bolts pass are not suitably spaced for the desired spacing of pick-up guards and I therefore provide the adapters of my invention. These preferably comprise a body 17 having a pad 18 extending lengthwise of the framework 6 and provided with suitable apertures 19 thru which fastening bolts 16 extend to secure the body to the supporting framework. Intermediate its ends, the body 17 is provided with an offset for situating a second pad 21 below one of the prongs 13. The amount of offset is dependent upon the particular spacing desired for the pick-up guards and can be appropriately selected to afford any predetermined relationship. The pad 21 is normally located at right angles to the pad 18 and is considerably displaced therefrom. It is pierced by apertures to receive fastening means 22 for attachment of a customary pick-up guard 23. For reinforcing the body and aiding in bearing the weight of the pick-up guard as well as the weight of any grain which might be carried thereby, I preferably construct integrally with the body 17 a metallic loop 24 contoured to overlie the projecting prong 13 of the sickle guard. This loop may be passed over the projecting prong 13 and contacts therewith to form an additional support for the body 17.

The use of the pick-up guard adapter of my invention permits the spacing of the pick-up guards 23 in any desired relationship with respect to the apertures 19 piercing the supporting framework 6, and further provides a strong and effective support for the pick-up guard.

It is to be understood that I do not limit myself to the form of the pick-up guard adapter shown and described herein, as the invention, as set forth in the following claims, may be embodied in a plurality of forms.

I claim:

1. A pick-up guard adapter comprising a body, a pad on said body for securing a pick-up guard to said adapter, and a second pad on said body disposed in a plane substantially perpendicular to the plane of said first pad and offset laterally therefrom for securing said adapter to a member of a harvesting machine.

2. A pick-up guard adapter comprising a body, a pad on said body for securing a pick-up guard to said adapter, said adapter being separable from the pick-up guard, a second pad on said body disposed in a plane substantially perpendicular to the plane of said first pad for securing said adapter to a member of a harvesting machine, and a loop on said adapter for embracing a prong of a sickle guard on the harvesting machine.

3. A pick-up guard adapter comprising a body, a pad on said body for securing a pick-up guard to said adapter, a second pad on said body disposed in plane substantially perpendicular to said first mentioned pad and offset therefrom for abutting against a substantially vertical side of a member of a harvesting machine, and means for securing said second pad to the harvesting machine.

4. In a header, a frame, a sickle guard, an adapter, means to secure said adapter and said guard to said frame, means integral with said adapter and extending upwardly therefrom to encompass a portion of said guard, and a pick-up guard separable from and adapted to be rigidly attached to said adapter.

5. In a header, a frame, a plurality of sickle guards, a pick-up guard, a bracket, means to secure said bracket to said sickle guards and to secure said sickle guards to said frame, means integral with said bracket and offset laterally with respect to said securing means for attachment to one of said sickle guards and to said pick-up guard.

6. In a header, a sickle guard, a pick-up guard, and a bracket separable from and adapted to be rigidly attached to said guards.

7. In a header, a frame, a pair of sickle guards, a pick-up guard, a bracket attached to said frame intermediate said sickle guards, having a portion underlying one of said sickle guards for attachment to said pick-up guard.

8. In a header, a pair of sickle guards, a pick-up guard, a bracket secured to said sickle guards and having a pad under one of said sickle guards, and a loop extending upwardly from said pad to embrace said guard, and means to secure said pick-up guard to said pad.

9. A pick-up guard adapter comprising a body provided with laterally offset portions, one providing a mounting for a pick-up guard and the other providing a base for securing the adapter to a harvesting machine.

10. A pick-up guard adapter comprising a body provided with a pad adjacent one end forming a mounting for a pick-up guard, and a pad adjacent the opposite end providing means for securing the adapter to a harvesting machine, the second pad being offset laterally with respect to the first pad and having its face in a vertical plane for abutting against a substantially vertical side of a member of the harvesting machine.

11. A pick-up guard adapter comprising a body provided with a pad adjacent one end forming a mounting for a pick-up guard, and a pad adjacent the opposite end providing means for securing the adapter to a harvesting machine, the second pad being offset laterally with respect to the first pad and having its face in a vertical plane for abutting against a substantially vertical side of a member of the harvesting machine, and the first pad having its face in a plane substantially perpendicular to that of the second pad.

12. A pick-up guard adapter comprising a body, a pad on said body for providing a mounting for a pick-up guard, and a second pad on said body laterally offset with respect to the first pad and to a pick-up guard when mounted on said first pad, whereby the second pad may be secured to a harvesting machine in a position at one side of the pick-up guard.

13. In a header, a frame, a pair of sickle guards secured to said frame, a bracket attached to said frame intermediate said sickle guards and having a portion offset laterally, and a pick-up guard carried by said laterally offset portion.

14. In a header, a frame, a pair of sickle guards secured to said frame, a bracket attached to said frame intermediate said sickle guards, and means for securing a pick-up guard to said bracket.

15. In a header, a frame, a pair of sickle guards secured to said frame, a bracket attached to said frame intermediate said sickle guards and having a portion offset laterally, a pick-up guard carried by said laterally offset portion, and means on said bracket for attachment to a sickle guard.

In testimony whereof, I have hereunto set my hand.

LOWELL H. THOEN.